US012385299B2

(12) United States Patent
Estrada et al.

(10) Patent No.: US 12,385,299 B2
(45) Date of Patent: Aug. 12, 2025

(54) APPARATUS AND METHOD FOR UNIFORM RELEASE EFFORT IN A VEHICLE LATCH

(71) Applicant: Inteva Products, LLC, Troy, MI (US)

(72) Inventors: Eduardo Estrada, Chihuahua (MX); J. Eli Calamaco, Chihuahua (MX); Martin R. Villagrana Noris, Chihuahua (MX); Victor D. Varela Antillon, Chihuahua (MX)

(73) Assignee: INTEVA PRODUCTS, LLC, Troy, MI (US)

(*) Notice: Subject to any disclaimer, the term of this patent is extended or adjusted under 35 U.S.C. 154(b) by 735 days.

(21) Appl. No.: 15/891,933

(22) Filed: Feb. 8, 2018

(65) Prior Publication Data

US 2018/0230722 A1 Aug. 16, 2018

Related U.S. Application Data

(60) Provisional application No. 62/456,607, filed on Feb. 8, 2017.

(51) Int. Cl.
*E05B 85/26* (2014.01)
*E05B 85/24* (2014.01)

(52) U.S. Cl.
CPC ............ *E05B 85/26* (2013.01); *E05B 85/243* (2013.01)

(58) Field of Classification Search
CPC ........ E05B 85/26; E05B 85/243; E05B 79/22; E05B 79/10; E05B 77/04; E05B 77/06; Y10S 292/23; Y10T 292/1082; Y10T 292/1047; Y10T 292/1076
See application file for complete search history.

(56) References Cited

U.S. PATENT DOCUMENTS

| | | | | |
|---|---|---|---|---|
| 2,989,333 A * | 6/1961 | Fox | E05B 85/28 292/336.3 |
| 4,892,339 A * | 1/1990 | Kleefeldt | E05B 81/14 292/201 |
| 4,995,654 A * | 2/1991 | Nishigami | E05B 77/12 292/216 |

(Continued)

FOREIGN PATENT DOCUMENTS

| | | | |
|---|---|---|---|
| CN | 203846892 U * | 9/2014 | E05B 77/04 |
| CN | 106246013 A | 12/2016 | |

(Continued)

OTHER PUBLICATIONS

CN Office Action for Application No. 201810131078.5; Date Issued: Sep. 28, 2020.
CN Search Report for Application No. 201810131078.5.
English Translation CN Office Action for Application No. 201810131078.5; Date Issued: Sep. 28, 2020.
China Office Action for China Application No. 201810131078.5; Date of Issue: Oct. 22, 2021, with English Translation, 17 pages.

(Continued)

*Primary Examiner* — Kristina R Fulton
*Assistant Examiner* — James Edward Ignaczewski
(74) *Attorney, Agent, or Firm* — CANTOR COLBURN LLP

(57) ABSTRACT

In one embodiment, a release mechanism for a latch is provided. The release mechanism having: a first release lever, the first release lever having a first lever and a second lever; a second release lever operatively coupled to the first release lever; and a spring operatively coupled to the first lever and the second lever such that a biasing force of the spring must be overcome in order to effectuate movement of the second release lever via the first release lever.

19 Claims, 9 Drawing Sheets

(56) References Cited

U.S. PATENT DOCUMENTS

| | | | | | |
|---|---|---|---|---|---|
| 5,433,496 | A * | 7/1995 | Zimmermann | E05B 81/20 | 292/201 |
| 6,053,543 | A * | 4/2000 | Arabia, Jr. | E05B 81/34 | 292/216 |
| 8,342,581 | B2 * | 1/2013 | Dow | E05B 85/12 | 292/216 |
| 9,194,162 | B2 * | 11/2015 | Perkins | E05C 19/12 | |
| 9,752,355 | B2 | 9/2017 | Nagaoka et al. | | |
| 10,392,838 | B2 | 8/2019 | Tomaszewski | | |
| 2002/0074805 | A1 | 6/2002 | Perkins et al. | | |
| 2002/0167178 | A1 * | 11/2002 | Spurr | E05B 81/14 | 292/201 |
| 2014/0312632 | A1 | 10/2014 | Nagaoka et al. | | |
| 2015/0069766 | A1 * | 3/2015 | Estrada | E05B 77/12 | 292/194 |
| 2015/0097379 | A1 | 4/2015 | Spurr et al. | | |
| 2016/0160537 | A1 * | 6/2016 | Estrada | E05B 81/06 | 292/241 |
| 2017/0191290 | A1 * | 7/2017 | Estrada | E05B 77/06 | |

FOREIGN PATENT DOCUMENTS

| | | | | |
|---|---|---|---|---|
| DE | 202011004952 | U1 * | 8/2012 | E05B 15/04 |
| EP | 2792829 | A2 * | 10/2014 | E05B 63/04 |
| KR | 100142913 | B1 | 8/1998 | |
| KR | 1020110060157 | A | 6/2011 | |
| KR | 101434980 | B1 | 8/2014 | |

OTHER PUBLICATIONS

China Office Action for China Application No. 201810131078.5; Application Filing Date: Feb. 8, 2018; Date of Action: May 1, 20214, 16 pages, with English Translation.

Decision of Rejection for Chinese Application No. 201810131078.5 Issued Apr. 14, 2022; 5 Pages.

Translation of Decision of Rejection for Chinese Application No. 201810131078.5 Issued Apr. 14, 2022; 12 Pages.

English Translation of Korean Office Action for Korean Application No. 1020180015646 Issued Mar. 15, 2022; 10 Pages.

Korean Office Action for Korean Application No. 1020180015646 Issued Mar. 15, 2022; 10 Pages.

Machine Translation of KR100142913B1; Date of Publication: Aug. 1, 1998; 3 Pages.

Machine Translation of KR1020110060157; Date of Publication: Jun. 8, 2011; 5 Pages.

Office Action issued on Jan. 25, 2023 in Korean Application No. 10-2018-0015646, filed Feb. 8, 2018; 8 pages (English translation included).

Office Action issued on Sep. 26, 2022 in Korean Application No. 10-2018-0015646, 4 pages.

Office Action issued on Sep. 26, 2022 in Korean Application No. 10-2018-0015646, 4 pages (Machine Translation).

Korean Office Action corresponding to KR Application No. 10-2023-0081200; Issue Date, Mar. 23, 2024.

* cited by examiner

APPARATUS AND METHOD FOR UNIFORM RELEASE EFFORT IN A VEHICLE LATCH

CROSS REFERENCE TO RELATED APPLICATIONS

This application claims priority to U.S. Provisional Patent Application Ser. No. 62/456,607 filed on Feb. 8, 2017, the entire contents of which are incorporated herein by reference thereto.

BACKGROUND

Various embodiments of the present invention relate to a latch and more particularly, a release mechanism for a vehicle latch.

The typical outside release effort profile for a vehicle latch shows a rapid transition when the linkage of the mechanism reaches or makes contact with the pawl release lever. The high effort on the outside release effort profile of the vehicle latch will depend on the amount seal load and the friction at the interface between pawl and claw. The effect on the latch when the latch mechanism is operated from the outside handle will have a sudden change in the operator's required force or effort (for example, a spike) in order to operate it. As mentioned above, this rapid transition in the required force occurs when the linkage of the mechanism reaches contact with the pawl release lever. In addition, these rapid changes in the required force may also be encountered in an inside release lever.

Thus, it is desirable to provide an apparatus, or feature or method of operation that provides a "smoother feeling" or gradual transition from the initial effort to the final contact with pawl release lever and final travel of the pawl release lever to a position where the claw of the latch is released or allowed to move from a latched position to an unlatched position.

SUMMARY OF THE INVENTION

In one embodiment, an outside release mechanism for a latch is provided. The outside release mechanism having: a first outside release lever, the first outside release lever having a first lever and a second lever; a second outside release lever operatively coupled to the first outside release lever; and a spring operatively coupled to the first lever and the second lever such that a biasing force of the spring must be overcome in order to effectuate movement of the second outside release lever via the first outside release lever.

In addition to one or more of the features described above, or as an alternative to any of the foregoing embodiments, the spring gradually increases a required force to operate the outside release mechanism.

In addition to one or more of the features described above, or as an alternative to any of the foregoing embodiments, the second outside release lever may be operatively coupled to an intermittent link and the intermittent link may be operatively coupled to a pawl release lever and the pawl release lever may also operatively coupled to a pawl, wherein pivotal movement of the first outside release lever about its axis will cause movement of the second outside release lever, the intermittent link, the pawl release lever and the pawl such that a claw can pivot from a latched position to an unlatched position.

In addition to one or more of the features described above, or as an alternative to any of the foregoing embodiments, the pawl release lever and the pawl may rotate about the same axis.

In addition to one or more of the features described above, or as an alternative to any of the foregoing embodiments, the first outside release lever may be operatively coupled to an outside handle via linkage.

In addition to one or more of the features described above, or as an alternative to any of the foregoing embodiments, the first lever may be pivotally mounted to the second lever.

In addition to one or more of the features described above, or as an alternative to any of the foregoing embodiments, the first lever may be operably coupled to an outside handle.

In addition to one or more of the features described above, or as an alternative to any of the foregoing embodiments, the second lever may have a pin configured to slidably engage a cam surface of the second outside release lever.

In addition to one or more of the features described above, or as an alternative to any of the foregoing embodiments, the first lever may have a feature configured to contact a feature of the second lever, wherein the biasing force of the spring must be overcome before the feature of the first lever contacts the feature of the second lever.

In addition to one or more of the features described above, or as an alternative to any of the foregoing embodiments, the first lever and the second lever may rotate about the same axis.

In addition to one or more of the features described above, or as an alternative to any of the foregoing embodiments, the feature of the first lever may be spaced from the feature of the second lever, when the outside release mechanism is in a first position.

In another embodiment, a vehicle latch is provided. The vehicle latch having: a claw pivotally mounted to the latch for movement between a latched position and an open position; a pawl pivotally mounted to the latch for movement between an engaged position and a disengaged position, wherein movement of the claw from the latched position to the open position is prevented by the pawl when the pawl is in the engaged position and wherein the claw is free to move into the open position from the latched position when the pawl is in the disengaged position; and an outside release mechanism for moving the pawl from the engaged position to the disengaged position, the outside release mechanism having: a first outside release lever, the first outside release lever having a first lever and a second lever; a second outside release lever operatively coupled to the first outside release lever; and a spring operatively coupled to the first lever and the second lever such that a biasing force of the spring must be overcome in order to effectuate movement of the second outside release lever via the first outside release lever.

In addition to one or more of the features described above, or as an alternative to any of the foregoing embodiments, the spring gradually increases a required force to operate the outside release mechanism.

In addition to one or more of the features described above, or as an alternative to any of the foregoing embodiments, the second outside release lever may be operatively coupled to an intermittent link and the intermittent link is operatively coupled to a pawl release lever and the pawl release lever is also operatively coupled to a pawl, wherein pivotal movement of the first outside release lever about its axis will cause movement of the second outside release lever, the intermittent link, the pawl release lever and the pawl such that a claw can pivot from a latched position to an unlatched position.

In addition to one or more of the features described above, or as an alternative to any of the foregoing embodiments, the pawl release lever and the pawl may rotate about the same axis.

In addition to one or more of the features described above, or as an alternative to any of the foregoing embodiments, the first outside release lever may be operatively coupled to an outside handle via linkage.

In addition to one or more of the features described above, or as an alternative to any of the foregoing embodiments, the first lever may be pivotally mounted to the second lever.

In addition to one or more of the features described above, or as an alternative to any of the foregoing embodiments, the second lever may have a pin configured to slidably engage a cam surface of the second outside release lever and wherein the first lever has a feature configured to contact a feature of the second lever, wherein the biasing force of the spring must be overcome before the feature of the first lever contacts the feature of the second lever.

In addition to one or more of the features described above, or as an alternative to any of the foregoing embodiments, the first lever and the second lever may rotate about the same axis.

In another embodiment, a method of disengaging a pawl from engagement with a claw of a latch is provided. The method including the steps of: pivotally mounting the claw for movement between an open position and a closed position; pivotally mounting the pawl to the latch for movement between a latched position and a released position, wherein the pawl engages the claw and prevents the claw from moving from the closed position to the open position when pawl is in the latched position; moving a first outside release lever of an outside release mechanism of the latch via an outside release handle, wherein the first outside release lever has a first lever and a second lever; and biasing the first lever away from the second lever via a spring operatively coupled to the first lever and the second lever such that a biasing force of the spring must be overcome in order to effectuate movement of a second outside release lever via the first outside release lever.

In yet another embodiment, a release mechanism for a latch is provided. The release mechanism having: a first release lever, the first release lever having a first lever and a second lever; a second release lever operatively coupled to the first release lever; and a spring operatively coupled to the first lever and the second lever such that a biasing force of the spring must be overcome in order to effectuate movement of the second release lever via the first release lever.

In addition to one or more of the features described above, or as an alternative to any of the foregoing embodiments, the spring gradually increases a required force to operate the release mechanism.

In addition to one or more of the features described above, or as an alternative to any of the foregoing embodiments, the second release lever may be operatively coupled to an intermittent link and the intermittent link may be operatively coupled to a pawl release lever and the pawl release lever may also operatively coupled to a pawl, wherein pivotal movement of the first release lever about its axis will cause movement of the second release lever, the intermittent link, the pawl release lever and the pawl such that a claw can pivot from a latched position to an unlatched position.

In addition to one or more of the features described above, or as an alternative to any of the foregoing embodiments, the pawl release lever and the pawl may rotate about the same axis.

In addition to one or more of the features described above, or as an alternative to any of the foregoing embodiments, the first release lever may be operatively coupled to a handle via linkage.

In addition to one or more of the features described above, or as an alternative to any of the foregoing embodiments, the first lever may be pivotally mounted to the second lever.

In addition to one or more of the features described above, or as an alternative to any of the foregoing embodiments, the first lever may be operably coupled to a handle.

In addition to one or more of the features described above, or as an alternative to any of the foregoing embodiments, the second lever may have a pin configured to slidably engage a cam surface of the second release lever.

In addition to one or more of the features described above, or as an alternative to any of the foregoing embodiments, the first lever may have a feature configured to contact a feature of the second lever, wherein the biasing force of the spring must be overcome before the feature of the first lever contacts the feature of the second lever.

In addition to one or more of the features described above, or as an alternative to any of the foregoing embodiments, the first lever and the second lever may rotate about the same axis.

In addition to one or more of the features described above, or as an alternative to any of the foregoing embodiments, the feature of the first lever may be spaced from the feature of the second lever, when the release mechanism is in a first position.

In addition to one or more of the features described above, or as an alternative to any of the foregoing embodiments, the release mechanism is an inside release mechanism operatively coupled to an inside handle.

In addition to one or more of the features described above, or as an alternative to any of the foregoing embodiments, the release mechanism is an outside release mechanism operatively coupled to an outside handle.

In another embodiment, a method of disengaging a pawl from engagement with a claw of a latch is provided. The method including the steps of: pivotally mounting the claw for movement between an open position and a closed position; pivotally mounting the pawl to the latch for movement between a latched position and a released position, wherein the pawl engages the claw and prevents the claw from moving from the closed position to the open position when pawl is in the latched position; moving a first release lever of a release mechanism of the latch via a release handle, wherein the first release lever has a first lever and a second lever; and biasing the first lever away from the second lever via a spring operatively coupled to the first lever and the second lever such that a biasing force of the spring must be overcome in order to effectuate movement of a second release lever via the first release lever.

In addition to one or more of the features described above, or as an alternative to any of the foregoing embodiments, the release mechanism is an inside release mechanism operatively coupled to an inside handle.

In addition to one or more of the features described above, or as an alternative to any of the foregoing embodiments, the release mechanism is an outside release mechanism operatively coupled to an outside handle.

In another embodiment, a vehicle latch is provided. The vehicle latch having: a claw pivotally mounted to the latch for movement between a latched position and an open position; a pawl pivotally mounted to the latch for movement between an engaged position and a disengaged position, wherein movement of the claw from the latched position to the open position is prevented by the pawl when the pawl is in the engaged position and wherein the claw is free to move into the open position from the latched position when the pawl is in the disengaged position; and a release mechanism for moving the pawl from the engaged position to the disengaged position, the release mechanism having: a first release lever, the first release lever having a first lever and a second lever; a second release lever operatively coupled to the first release lever; and a spring operatively coupled to the first lever and the second lever such that a biasing force of the spring must be overcome in order to effectuate movement of the second release lever via the first release lever.

In addition to one or more of the features described above, or as an alternative to any of the foregoing embodiments, the release mechanism is an inside release mechanism operatively coupled to an inside handle.

In addition to one or more of the features described above, or as an alternative to any of the foregoing embodiments, the release mechanism is an outside release mechanism operatively coupled to an outside handle.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As mentioned above, it is desirable to provide certain latches with an apparatus, or feature or method of operation that provides a "smoother feeling" or gradual transition from the initial effort to the final contact with pawl release lever and final travel of the pawl release lever to a position where the claw of the latch is released or allowed to move from a latched position to an unlatched position.

In order to have a smoother transition on the outside effort output various embodiments of the present disclosure softens each transition by means of spring element located on an outside release lever of a latch. This will gradually increase the effort to release instead of having sudden changes as the mechanism chain starts to connect. This spring will be acting directly on the outside linkage and therefore, the force required to initiate motion on the final component (pawl lever) will depend on the spring rate as well as other force contributors such as friction, returning springs and seal load.

Figure 1:
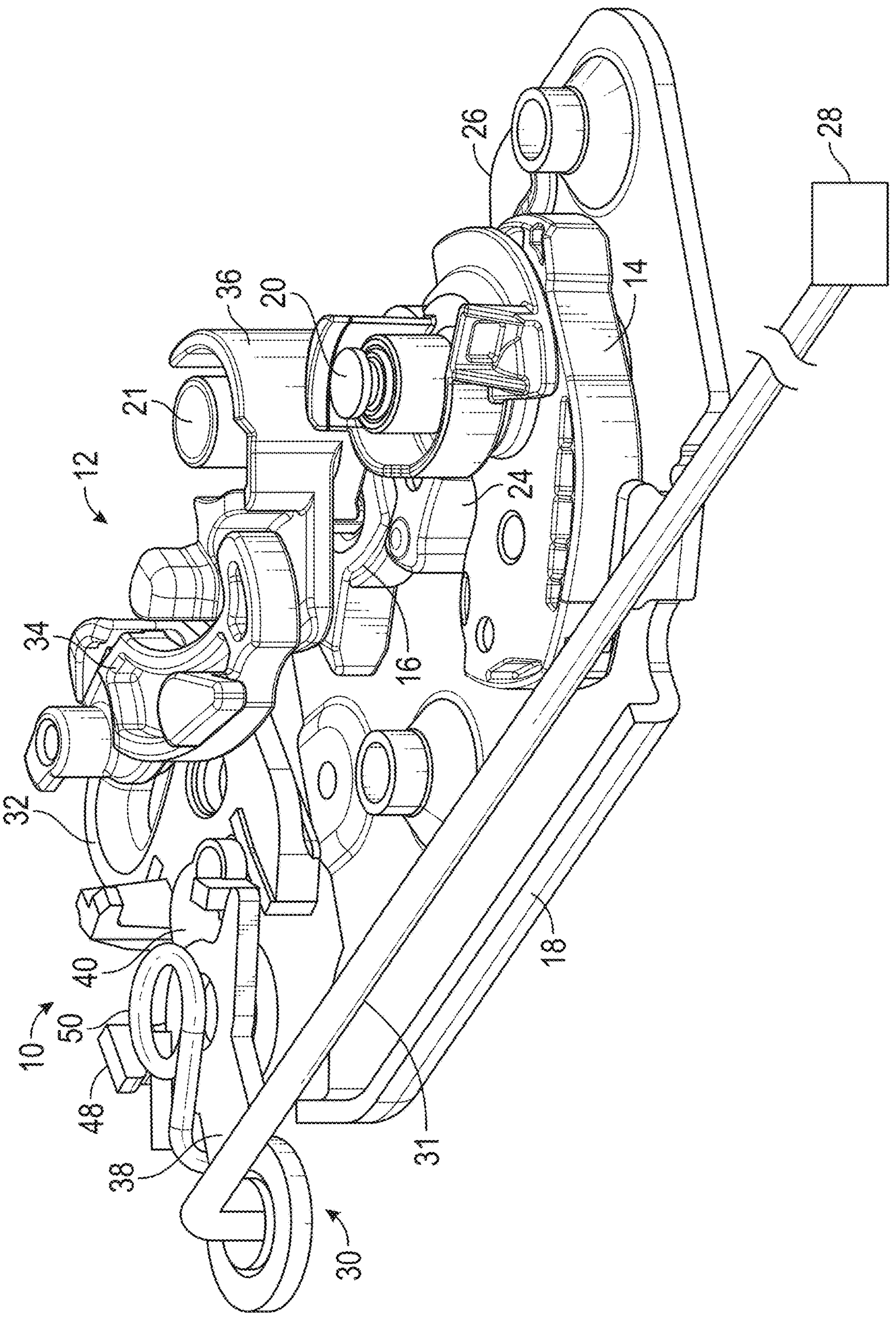
FIG. 1 is a perspective view of portions of a latch in a primary or latched position in accordance with one non-limiting embodiment.
Figure 1A:
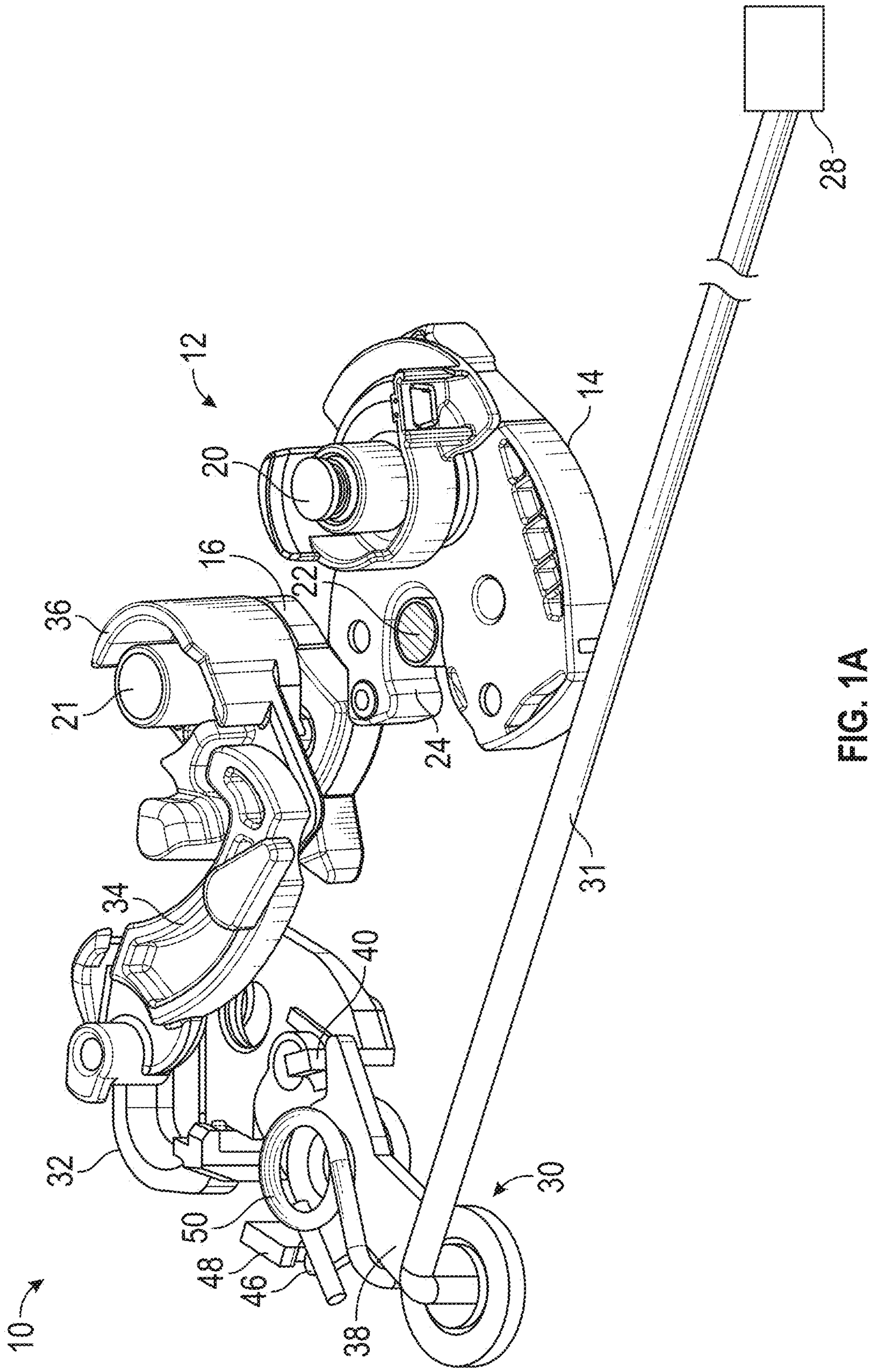
FIG. 1A is a perspective view of portions of the latch illustrated in FIG. 1 in accordance with one non-limiting embodiment.

Referring now to the FIGS. various embodiments of the invention will be described with reference to specific embodiments, without limiting same. Referring now to FIGS. 1 and 1A portions of a release mechanism 10 of a latch or latch assembly 12 are illustrated. It being understood that for clarity purposes only portions of release mechanism 10 and latch 12 are illustrated in the attached FIGS.

In one embodiment, the latch or latch assembly 12 may be a vehicle door latch. Latch 12 may be configured to keep a vehicle door latched. Still further the latch 12 can be used with any vehicle door or movable component that needs to be latched and unlatched with respect to the vehicle.

As mentioned above, the latch 12 is applicable to any environment where the features of various embodiments of the invention are desired. For example, the latch assembly 12 can be attached to a vehicle structure such that the fork bolt is moved between the open position and the closed position when a door, window, lift gate, hood, etc. is opened and closed and the fork bolt engages a striker that is attached to the door, window, lift gate, hood etc.

Alternatively, the latch 12 or latch assembly 12 can be secured to the door, window, lift gate, hood etc. and the striker is secured to the vehicle body at an opening into which the door, window, lift gate, hood etc. is received.

Latch 12 includes a fork bolt or claw 14 and a detent lever or pawl 16. Each of which may be pivotally or movably mounted to a housing or plate 18 or another portion or other housing portion of the latch 12. In one non-limiting embodiment, the fork bolt 14 is capable of rotation about first stud or pin 20, while detent lever or pawl 16 is a capable of rotation about a second stud or pin 21. During operation, a striker 22 (illustrated in cross-section in at least FIG. 2B) is attached to a second element or second vehicle component, which is either the frame or movable member depending on which one has the latch 12 secured thereto.

In accordance with an exemplary embodiment, the fork bolt 14 is capable of movement between a first or latched position or closed position (see at least FIGS. 1, 2A and 2B) wherein the striker is engaged by a throat 24 of the fork bolt 14 and a second or open position (see at least FIGS. 2G and 2H) wherein the striker is free to be released from the throat 24 of the fork bolt 14. The housing of the latch 12 will also have a complimentary opening 26 for receipt of the striker 22 therein when it is engaged or latched by the fork bolt. In one non-limiting embodiment, the fork bolt 14 may be spring biased into the second or open position by a spring or biasing member.

Alternatively or in addition to the spring biasing force applied to the fork bolt, the movable member the striker is secured to may also be spring biased or biased into an open position such that when the latch 12 is released fork bolt 14 will rotate and release striker. One non-limiting example of an item providing such a force is the compressed weather stripping or sealing member located around the periphery of the opening that is covered by the movable member. In other words, when the door is closed, the sealing member is compressed and the latch 12 engages the striker. Thereafter and when the latch 12 is released, the sealing member may provide an urging force to open the door or gate, etc.

As is known in the related arts, the pawl 16 when in an engaged or latched position retains the claw 14 in the primary or latched position. In order to allow the claw 14 to rotate into an open or unlatched position, the pawl 16 must be moved or rotated from the engaged position or latched position to a disengaged position or a released position wherein the pawl 16 no longer block rotational movement of the claw 14. In one embodiment, the pawl 16 may be spring biased into the engaged or latched position.

In one embodiment, the release mechanism 10 applies a force to the pawl 16 in order to rotate it out of engagement with the claw 14 due to actuation of an outside handle 28 (shown schematically in FIG. 1) operatively coupled to a first outside release lever 30 of the release mechanism 10 via a rod, cable, linkage 31 (shown schematically in FIG. 1). In this embodiment, the outside handle 28 may be located on an exterior of the vehicle or other item the latch is secured to.

In an alternative embodiment, the release mechanism 10 may be a release mechanism that is operatively coupled to an inside handle that applies a force to the pawl 16 in order to rotate it out of engagement with the claw 14 due to actuation of an inside handle. In this embodiment the inside handle may also be represented by box 28 and inside release handle is located on an interior surface of the vehicle or vehicle door.

It is, of course, understood that latch 12 may also have two release mechanisms 10 as described herein, one for the outside release handle and one for inside release handle or alternatively, the latch 12 may only have one release mechanism 10 as described herein, either only for the outside release handle or only for the inside release handle.

Although as described below as an outside release mechanism 10, as mentioned above, the various embodiments of the present disclosure may also be applied to inside release mechanisms or any other type of release mechanisms that operate the latch via a handle located remotely from the latch 12.

The first outside release lever 30 is mounted for pivotal movement about an axis and is operatively coupled to a second outside release lever 32 that is pivotally mounted to the latch 12. The outside release lever 32 is also operatively coupled to an intermittent link 34. The intermittent link 34 is also operatively coupled to a pawl release, pawl release lever or pawl lifter 36 and the pawl release, pawl release lever or pawl lifter 36 is also operatively coupled to the pawl 16. Accordingly, pivotal or rotational movement of the first outside release lever 32 about its axis will cause movement of the second outside release lever 32, the intermittent link 34, the pawl release lever 36 and the pawl 16 such that the claw 14 can pivot from the latched position to an unlatched position. In one embodiment, the pawl release lever 36 and the pawl 16 may rotate about the same axis or pin 21.

In accordance with an embodiment of the present invention and in order to have a smoother transition on the outside effort applied to the release mechanism 10 from for example, the outside door handle 28 an apparatus and method for providing a smooth transition or gradually applied amount of required force to the release mechanism 10 is provided.

Referring now to FIGS. 2A-2H one embodiment of the present disclosure is illustrated. Here the same reference numerals are used for similar components to those illustrated in the FIG. 1 embodiment. In addition and as mentioned above and for sake of clarity, only some of the components of the release mechanism 10 and latch 12 are illustrated.

Figure 2B:
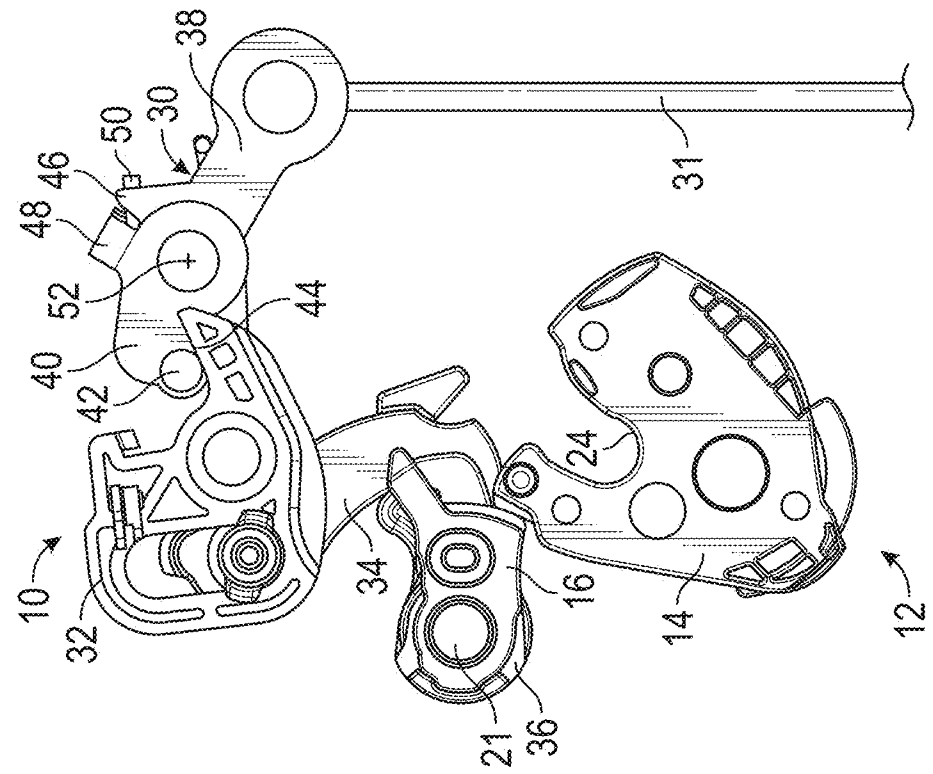
FIG. 2B is a bottom view of the outside release mechanism illustrated in FIG. 2A.
Figure 2A:
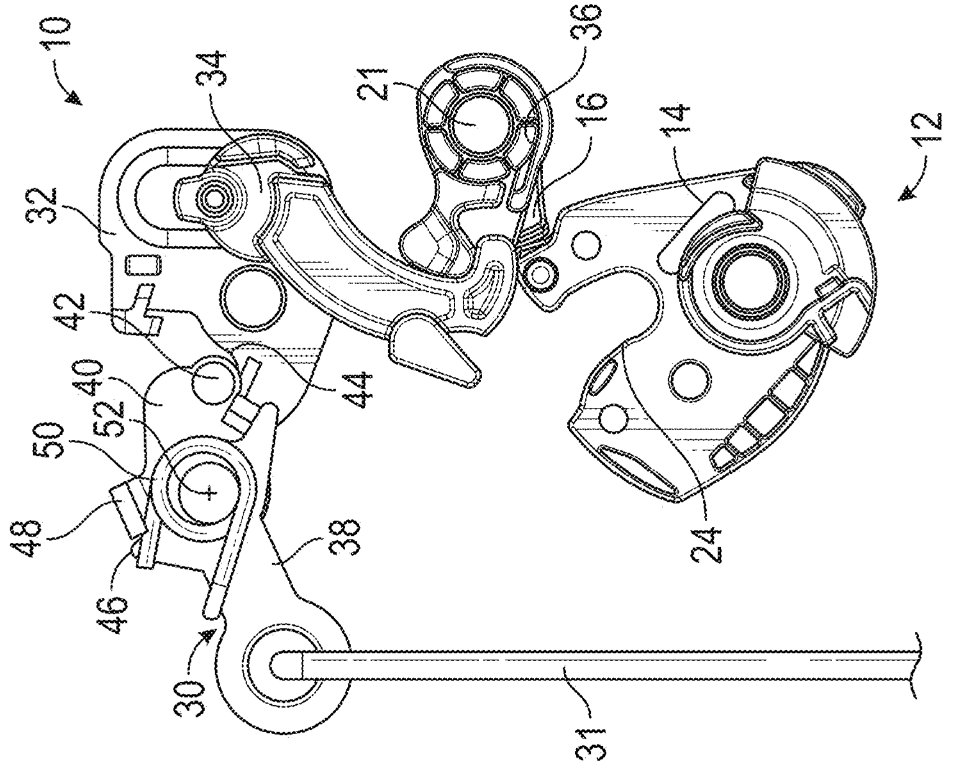
FIG. 2A is a top view of an outside release mechanism in a first position when the latch is in a primary or latched position.

Referring now to FIG. 2A a top view of an outside release mechanism 10 in accordance with an embodiment of the present disclosure is illustrated. In FIG. 2B a bottom view of the outside release mechanism illustrated in FIG. 2A is also provided. In FIGS. 2A and 2B the outside release mechanism 10 is in a first position and the latch 12 and its claw or forkbolt 14 is in a primary or latched position.

In this embodiment and as illustrated, the first outside release lever 30 includes a first lever 38 and a second lever 40. The first lever 38 is pivotally or movably mounted to the second lever 40. The first lever 38 is also operably coupled to an outside handle 28 (shown schematically) via a rod, cable, linkage 31. Thus and as the outside handle 28 is actuated, the first lever 38 moves with respect to the second lever 40. The second lever 40 is operably coupled to the second outside release lever 32 such that movement of the second lever 40 causes movement of the second outside release lever 32. In one embodiment, the second lever 40 has a pin or protrusion 42 configured to slidably engage a cam surface 44 of the second outside release lever 32.

In addition, the first lever 38 has a feature or tab 46 that is configured to contact a feature or tab 48 of the second lever 40 such that as the first lever 38 rotates or pivots towards the second lever 40, feature or tab 46 ultimately contacts feature or tab 48 of the second lever 40 and thus further rotation of the first lever 38 will cause movement of the second lever 40 via contact of features or tabs 46 and 48. Still further, a biasing member or spring 50 is configured to provide a biasing force to the first lever 38 and the second lever 40 such that features or tabs 46 are spaced from each other when the first outside release lever 30 comprising the first lever 38 and the second lever 40 are in the first position illustrated in at least FIGS. 2A and 2B. In one embodiment, the first lever 38 and the second lever 40 are configured for rotation about the same axis 52.

Figure 2D:
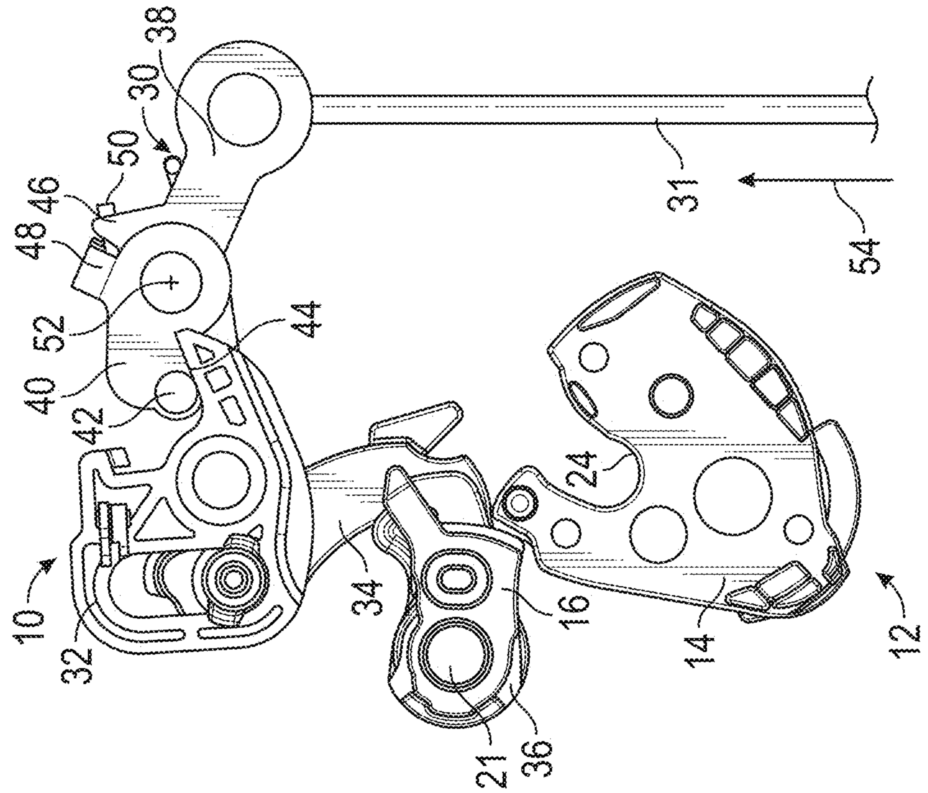
FIG. 2D is a bottom view of the outside release mechanism illustrated in FIG. 2C.
Figure 2C:
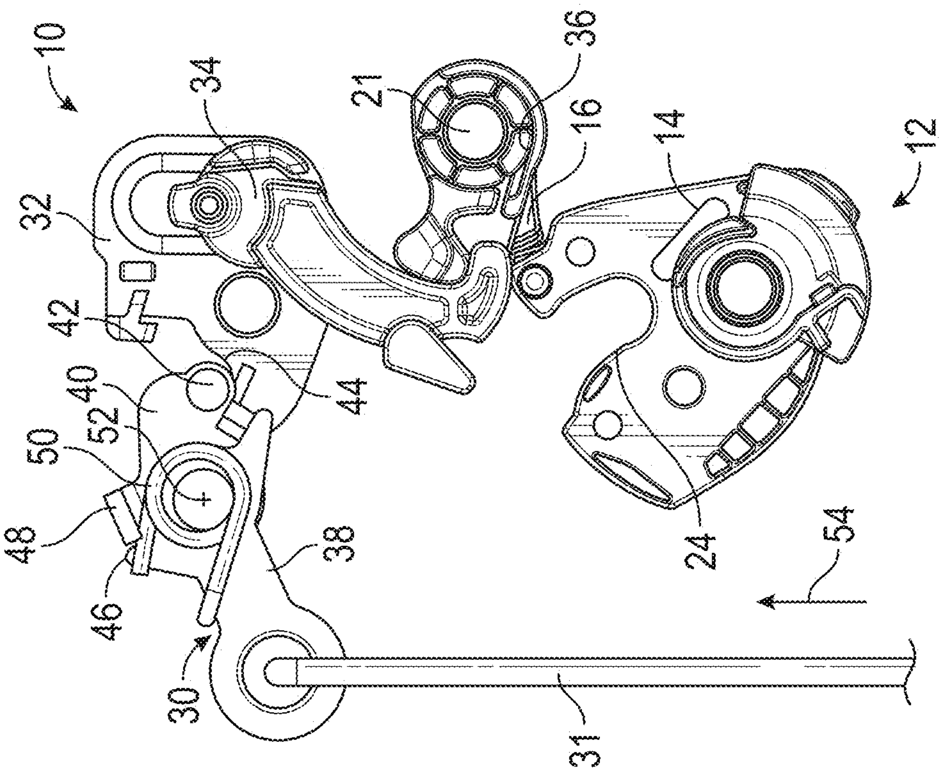
FIG. 2C is a top view of an outside release mechanism as it moves from the first position in FIGS. 2A and 2B.

FIG. 2C is a top view of an outside release mechanism as it moves from the first position in FIGS. 2A and 2B and FIG. 2D is a bottom view of the outside release mechanism illustrated in FIG. 2C. Here movement of the rod, cable or linkage 31 in the direction of arrow 54 as the outside handle 28 is actuated. Movement of the rod, cable or linkage 31 in the direction of arrow 54, causes the first lever 38 to move with respect to the second lever 40 and ultimately cause the second lever 40 to rotate or pivot about its axis due to first the compression of spring 50 and then feature 46 contacting feature 48 as spring 50 is compressed.

The movement of the second lever 40 causes movement of the intermittent link 34, which in turn causes movement of the pawl release lever 36 and ultimately the pawl 16 until the claw 14 is released and rotated into the open position.

By providing the first outside release lever 30 as a first lever 38 and a second lever 40, the applied force in the direction of arrow 54 gradually increases until the latch 12 is opened. This is due in part to the biasing force of spring 50 that is located between the first lever 38 and the second lever 40. Accordingly and as the outside release mechanism 10 transitions from the first position illustrated in FIGS. 2A and 2B to a second position illustrated in FIGS. 2C and 2D, there is a movement of the first outside release lever 30 (first lever 38, second lever 40), the second outside release lever 32, and the intermittent link 34 until it is in contact with the pawl release lever or pawl lifter 36.

Figure 2F:
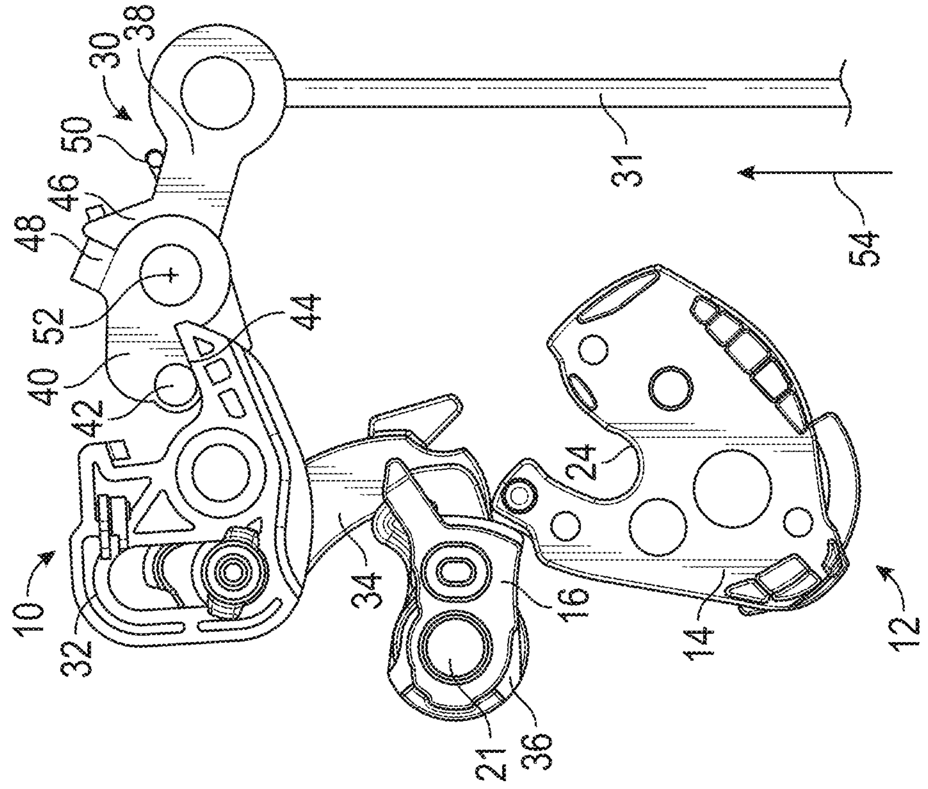
FIG. 2F is a bottom view of the outside release mechanism illustrated in FIG. 2E.
Figure 2E:
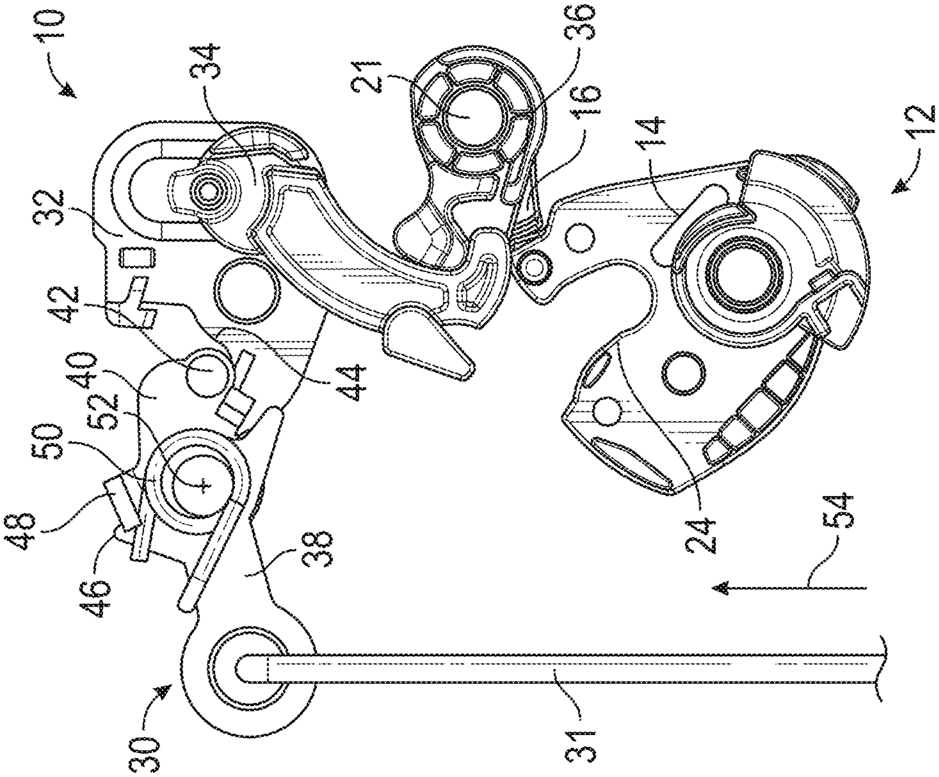
FIG. 2E is a top view of an outside release mechanism as it moves from the position illustrated in FIGS. 2C and 2D towards a release position.
Figure 2H:
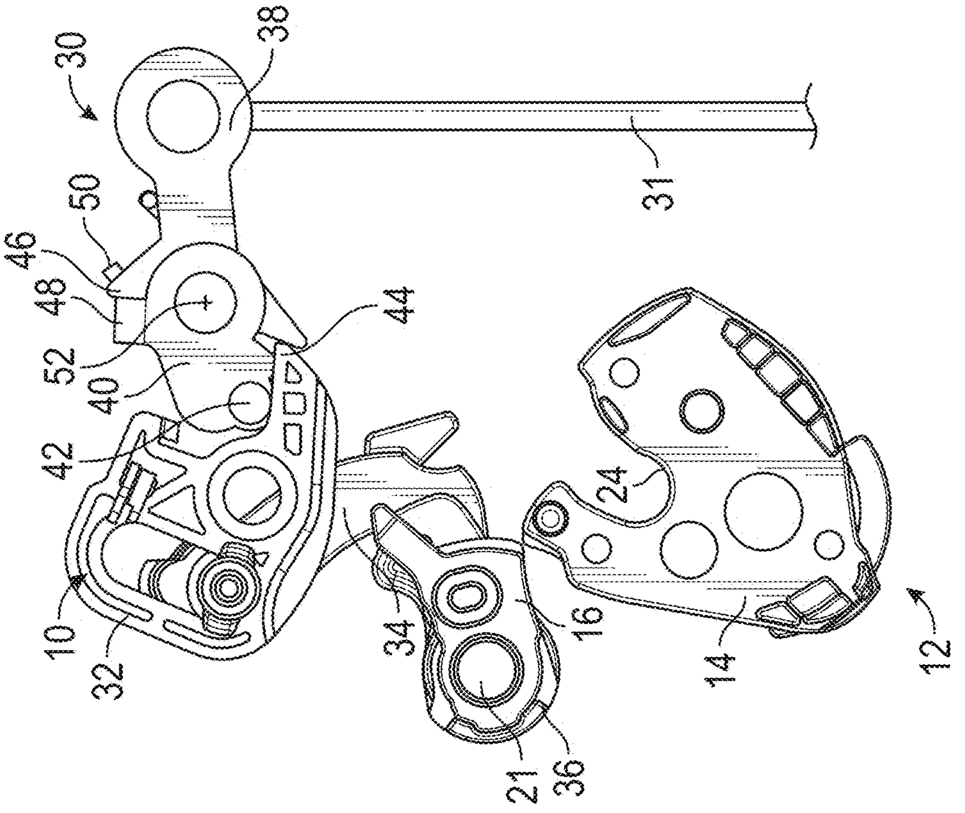
FIG. 2H is a bottom view of the outside release mechanism illustrated in FIG. 2G.
Figure 2G:
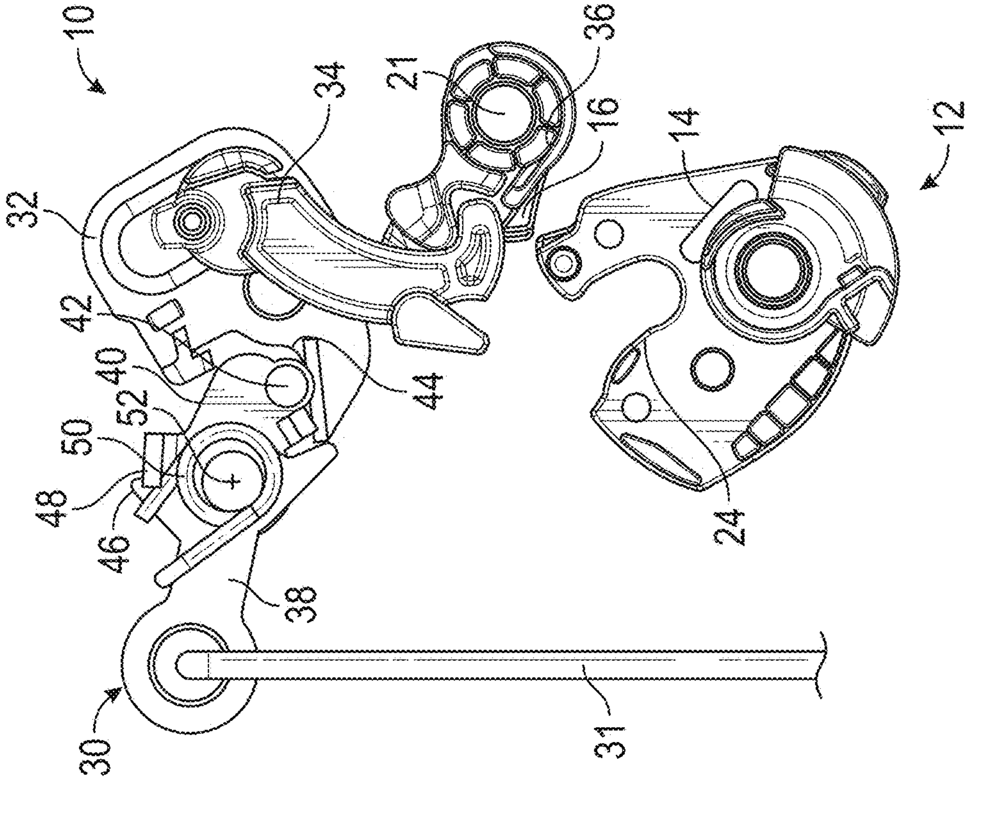
FIG. 2G is a top view of an outside release mechanism in a release position.

Thereafter and as illustrated in FIGS. 2E and 2F, continued movement of the first lever 38 about its axis 52 via movement of the rod, cable or linkage 31 in the direction of arrow 54, causes the first lever 38 to compress spring 50 as pawl release lever or pawl lifter 36 is now engaging the pawl 16. As such, the load upon the outside release mechanism 10 is gradually increased until spring 50 is fully compressed and then tab 46 engages tab 48 and protrusion 42 slides along cam surface 44 and the second outside release lever 32 is rotated until pawl 16 is moved to the disengaged position via the corresponding movements of intermittent link 34 and pawl release lever or pawl lifter 36. This final position is illustrated in at least FIGS. 2G and 2H.

Accordingly, various embodiments of the present disclosure softens or smooths each transition of the outside release mechanism 10 or alternatively an inside release mechanism through the use of a spring element or spring 50 located on the outside release lever 30. The spring element or spring 50 gradually increases the effort to release the release mechanism 10 instead of having sudden changes as the mechanism chain starts to connect with each of its components (e.g., pawl 16, pawl release lever or pawl lifter 36, intermittent link 34, second outside release lever 32 and first outside release lever 30 (first lever 38 and second lever 40). The spring 50 will be acting directly on the outside linkage, therefore the force required to initiate motion on the final component (pawl 16) will depend on the spring rate as well as other force contributors such as friction, returning springs and seal load.

Figure 3:
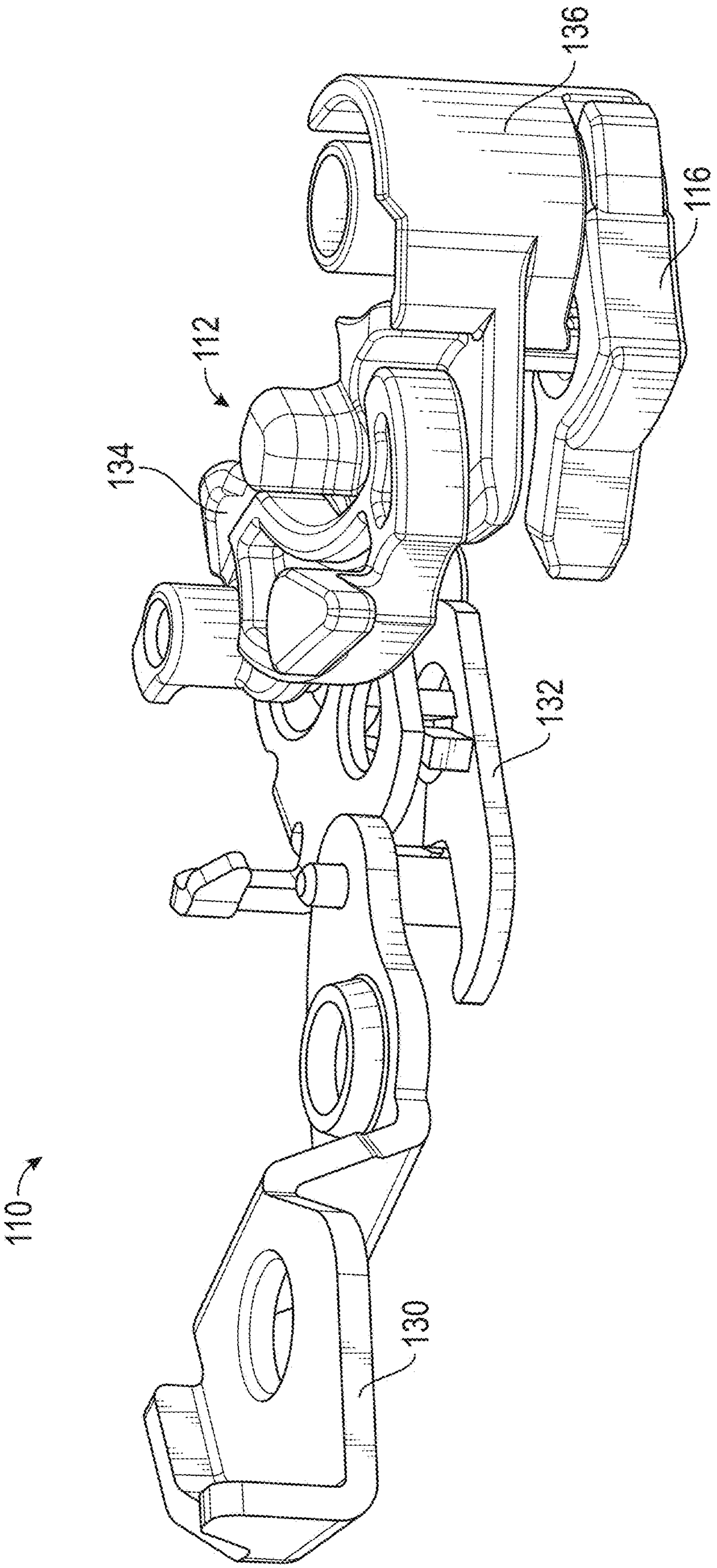
FIG. 3 is a perspective view of an alternative embodiment of the present invention.

Referring now to FIG. 3 a perspective view of an alternative embodiment of the present disclosure is illustrated. Here components performing similar or analogous functions are numbered in multiples of 100. In this embodiment, a release lever is provided as a first release lever 130 and second release lever 132.

Figure 4:
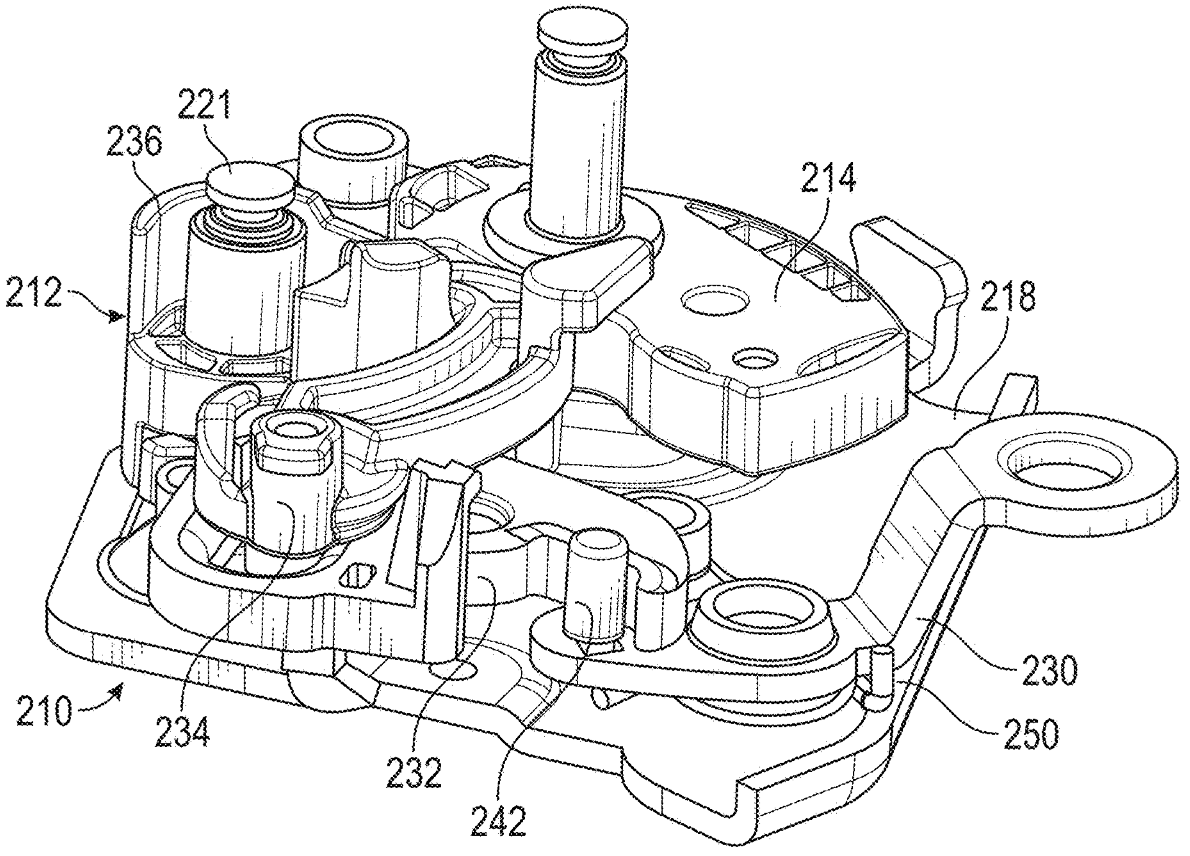
FIG. 4 is a perspective view of another alternative embodiment of the present invention.

Referring now to FIG. 4 a perspective view of yet another alternative embodiment of the present disclosure is illustrated. Here components performing similar or analogous functions are numbered in multiples of 100. In this embodiment, a spring 250 is providing a uniform biasing force to first release lever 130 prior to its protrusion 242 contacting the second release lever 232.

Figure 5:
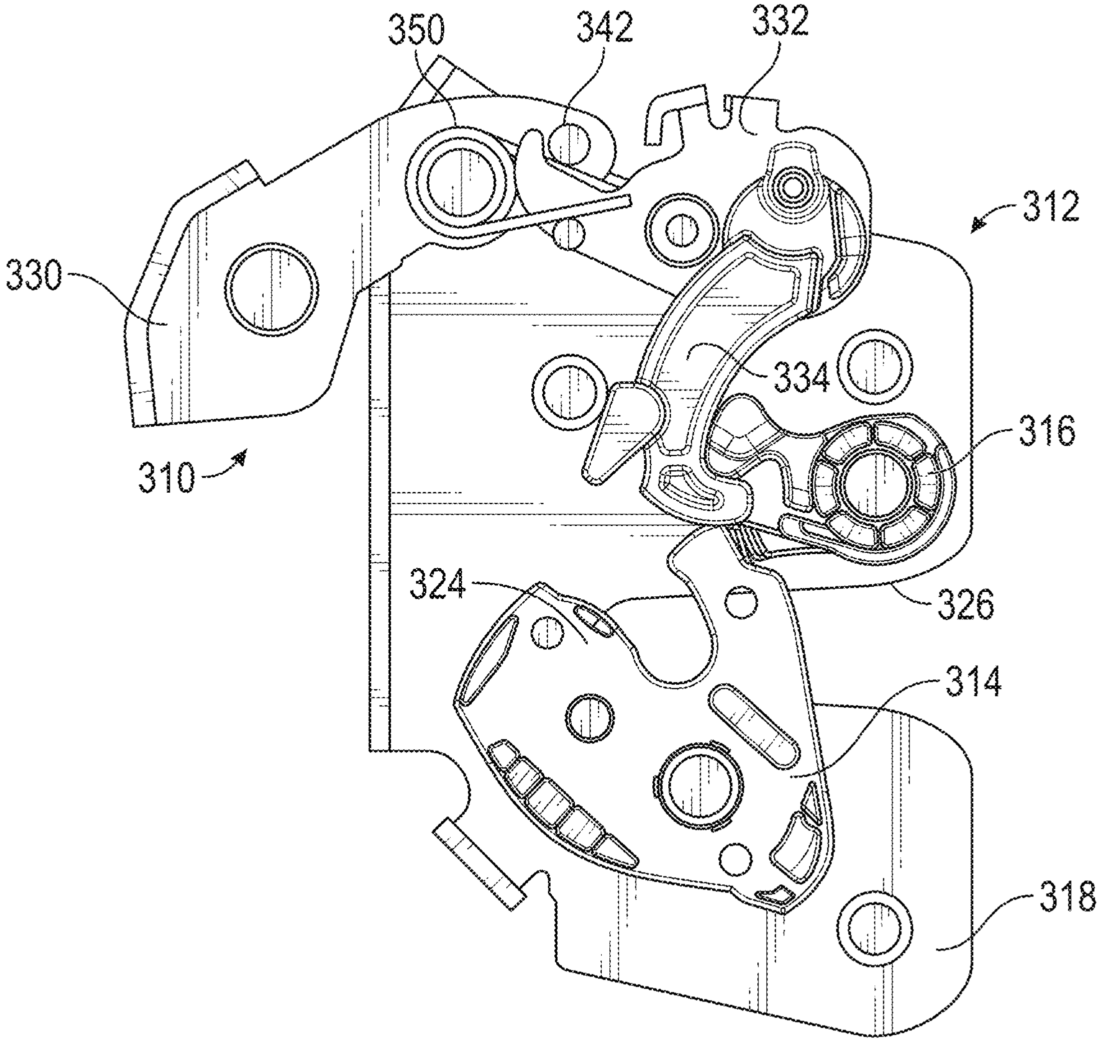
FIG. 5 is a perspective view of still another alternative embodiment of the present invention.

Referring now to FIG. 5 a perspective view of yet another alternative embodiment of the present disclosure is illustrated. Here components performing similar or analogous functions are numbered in multiples of 100. In this embodiment, a spring 350 is providing a uniform biasing force to first release lever 330 prior to its protrusion 342 contacting the second release lever 332. In this embodiment, the spring 350 is directly contacting the second outside release lever 332.

Various embodiments of the present invention are contemplated with a vehicle door latch, and other latches that utilize an outside release lever and/or an inside release lever.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. An outside release mechanism for a latch, comprising:

a first outside release lever, the first outside release lever having a first lever and a second lever;

a second outside release lever operatively coupled to the first outside release lever by the second lever such that movement of the second lever will cause movement of the second outside release lever; and a spring directly secured to the first lever and the second lever such that a biasing force of the spring prevents the first lever from contacting and moving the second lever and the biasing force of the spring must be overcome in order to effectuate movement of the second outside release lever via movement of the second lever of the first outside release lever, wherein the spring is configured to gradually increase a required force to operate the outside release mechanism, wherein the second outside release lever is operatively coupled to an intermittent link and the intermittent link is operatively coupled to a pawl.

2. The outside release mechanism as in claim 1, wherein the intermittent link is operatively coupled to a pawl release lever and the pawl release lever is also operatively coupled to the pawl, wherein pivotal movement of the first outside release lever about its axis will cause movement of the second outside release lever, the intermittent link, the pawl release lever and the pawl such that a claw can pivot from a latched position to an unlatched position.

3. The outside release mechanism as in claim 2, wherein the pawl release lever and the pawl rotate about the same axis.

4. The outside release mechanism as in claim 1, wherein the first outside release lever is operatively coupled to an outside handle via linkage.

5. The outside release mechanism as in claim 1, wherein the first lever is pivotally mounted to the second lever.

6. The outside release mechanism as in claim 1, wherein the first lever is operably coupled to an outside handle.

7. The outside release mechanism as in claim 1, wherein the second lever has a pin configured to slidably engage a cam surface of the second outside release lever.

8. The outside release mechanism as in claim 1, wherein the first lever has a feature configured to contact a feature of the second lever, wherein the biasing force of the spring must be overcome before the feature of the first lever contacts the feature of the second lever.

9. The outside release mechanism as in claim 8, wherein the first lever and the second lever rotate about the same axis.

10. The outside release mechanism as in claim 9, wherein the feature of the first lever is spaced from the feature of the second lever, when the outside release mechanism is in a first position.

11. A vehicle latch, comprising:

a claw pivotally mounted to the latch for movement between a latched position and an open position;

a pawl pivotally mounted to the latch for movement between an engaged position and a disengaged position, wherein movement of the claw from the latched position to the open position is prevented by the pawl when the pawl is in the engaged position and wherein the claw is free to move into the open position from the latched position when the pawl is in the disengaged position;

an outside release mechanism for moving the pawl from the engaged position to the disengaged position, the outside release mechanism comprising:

a first outside release lever, the first outside release lever having a first lever and a second lever;

a second outside release lever operatively coupled to the first outside release lever by the second lever such that movement of the second lever will cause movement of the second outside release lever; and a spring directly secured to the first lever and the second lever such that a biasing force of the spring prevents the first lever from contacting and moving the second lever and the biasing force of the spring must be overcome in order to effectuate movement of the second outside release lever via movement of the second lever of the first outside release lever, wherein the spring is configured to gradually increase a required force to operate the outside release mechanism.

12. The latch as in claim 11, wherein the second outside release lever is operatively coupled to an intermittent link and the intermittent link is operatively coupled to a pawl release lever and the pawl release lever is also operatively coupled to a pawl, wherein pivotal movement of the first outside release lever about its axis will cause movement of the second outside release lever, the intermittent link, the pawl release lever and the pawl such that a claw can pivot from a latched position to an unlatched position.

13. The latch as in claim 12, wherein the pawl release lever and the pawl rotate about the same axis.

14. The latch as in claim 11, wherein the first outside release lever is operatively coupled to an outside handle via linkage.

15. The latch as in claim 11, wherein the first lever is pivotally mounted to the second lever.

16. The latch as in claim 11, wherein the second lever has a pin configured to slidably engage a cam surface of the second outside release lever and wherein the first lever has a feature configured to contact a feature of the second lever, wherein the biasing force of the spring must be overcome before the feature of the first lever contacts the feature of the second lever.

17. The latch as in claim 16, wherein the first lever and the second lever rotate about the same axis.

18. A method of disengaging a pawl from engagement with a claw of a latch, comprising:

pivotally mounting the claw for movement between an open position and a closed position;

pivotally mounting the pawl to the latch for movement between a latched position and a released position, wherein the pawl engages the claw and prevents the claw from moving from the closed position to the open position when pawl is in the latched position;

moving a first outside release lever of an outside release mechanism of the latch via an outside release handle, wherein the first outside release lever has a first lever and a second lever; and biasing the first lever away from the second lever via a spring directly secured to the first lever and the second lever such that a biasing force of the spring must be overcome in order to allow the first lever to contact and move the second lever, wherein a second outside release lever is operably coupled to the first outside release lever by the second lever such that movement of the second lever will cause movement of the second outside release lever, wherein the spring is configured to gradually increase a required force to operate the outside release mechanism.

19. A release mechanism for a latch, comprising:

a first release lever, the first release lever having a first lever and a second lever;

a second release lever operatively coupled to the second lever of the first release lever; and a spring directly secured to the first lever and the second lever such that a biasing force of the spring prevents the first lever from contacting and moving the second lever and the biasing force of the spring must be overcome in order to effectuate movement of the second release lever via movement of the second lever of the first release lever, wherein the spring is configured to gradually increase a required force to operate the release mechanism, wherein the second outside release lever is operatively coupled to an intermittent link and the intermittent link is operatively coupled to a pawl.

* * * * *